United States Patent
Banerjee

(10) Patent No.: US 8,973,090 B1
(45) Date of Patent: Mar. 3, 2015

(54) SYSTEMS AND METHODS FOR PROTECTING PLATFORM-AS-A-SERVICE PLATFORMS

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 13/420,569

(22) Filed: Mar. 14, 2012

(51) Int. Cl.
H04L 29/06 (2006.01)
G06F 21/00 (2013.01)
G06F 21/51 (2013.01)

(52) U.S. Cl.
CPC ................................ *G06F 21/51* (2013.01)
USPC ................................................ 726/1; 726/22

(58) Field of Classification Search
None
See application file for complete search history.

(56) References Cited

U.S. PATENT DOCUMENTS

| | | | |
|---|---|---|---|
| 5,412,717 A * | 5/1995 | Fischer | 713/156 |
| 5,862,325 A | 1/1999 | Reed et al. | |
| 7,802,294 B2 | 9/2010 | Perlin et al. | |
| 2007/0143379 A1 | 6/2007 | i Dalfo et al. | |
| 2008/0109871 A1 * | 5/2008 | Jacobs | 726/1 |
| 2008/0134176 A1 | 6/2008 | Fitzgerald et al. | |
| 2010/0235903 A1 * | 9/2010 | Carter et al. | 726/15 |
| 2011/0265168 A1 * | 10/2011 | Lucovsky et al. | 726/7 |
| 2012/0011077 A1 * | 1/2012 | Bhagat | 705/317 |
| 2013/0024851 A1 * | 1/2013 | Firman et al. | 717/170 |

* cited by examiner

*Primary Examiner* — Samson Lemma
*Assistant Examiner* — Malcolm Cribbs
(74) *Attorney, Agent, or Firm* — ALG Intellectual Property, LLC

(57) ABSTRACT

A computer-implemented method for protecting platform-as-a-service platforms may include 1) identifying a platform-as-a-service platform that is configured to allow installations of third-party application packages, 2) intercepting a third-party application package in transit to the platform-as-a-service platform for installation, 3) extracting metadata from the third-party application package, and 4) applying a compliance policy to the third-party application package to determine whether to allow an installation of the third-party application package on the platform-as-a-service platform based on the metadata. Various other methods, systems, and computer-readable media are also disclosed.

19 Claims, 6 Drawing Sheets

SYSTEMS AND METHODS FOR PROTECTING PLATFORM-AS-A-SERVICE PLATFORMS

BACKGROUND

In the digital age, organizations increasingly depend on computing resources to manage data and to provide internal and external services. In order to manage increasingly complex information technology infrastructures, some organizations may use platform-as-a-service platforms for deploying applications. The platform-as-a-service model may allow organizations to bring applications online without acquiring, configuring, or maintaining the underlying hardware and software stack.

Delegating the maintenance of a computing platform to a third-party may save an organization time, may save the organization money, and/or may increase the flexibility with which the organization may select resources for and allocate resources to applications. Unfortunately, by outsourcing computing platforms, the same organization may reduce its control over the computing platforms, preventing the organization from applying security policies and other compliance policies not provided for by the platform-as-a-service provider. Accordingly, the instant disclosure identifies and addresses a need for additional and improved systems and methods for protecting platform-as-a-service platforms.

SUMMARY

As will be described in greater detail below, the instant disclosure generally relates to systems and methods for protecting platform-as-a-service platforms by intercepting attempts to install and/or configure third-party application packages on platform-as-a-service platforms and applying compliance policies to the third-party application packages based on metadata within the third-party application packages to determine whether to allow the attempts to install and/or configure the third-party application packages to proceed. In one example, a computer-implemented method for protecting platform-as-a-service platforms may include 1) identifying a platform-as-a-service platform that is configured to allow installations of third-party application packages, 2) intercepting a third-party application package in transit to the platform-as-a-service platform for installation, 3) extracting metadata from the third-party application package, and 4) applying a compliance policy to the third-party application package to determine whether to allow an installation of the third-party application package on the platform-as-a-service platform based on the metadata.

In some examples, intercepting the third-party application package may include intercepting the third-party application package on a proxy system configured to intercept network traffic leaving a computing environment, the computing environment including an administration system for the platform-as-a-service platform. Additionally or alternatively, intercepting the third-party application may include intercepting the third-party application package on a reverse proxy system. In this example, intercepting the third-party application package may include intercepting the third-party application package from a mobile computing device configured to use the reverse proxy system to access the platform-as-a-service platform.

In some embodiments, the metadata may include 1) information identifying a component of the third-party application package, 2) information identifying a data structure to create within the platform-as-a-service platform by the component, 3) information identifying a resource of an existing application within the platform-as-a-service platform subject to use by an application to be installed from the third-party application package, and/or 4) information identifying an external service to be accessed by the application from the platform-as-a-service platform.

In one example, applying the compliance policy to the third-party application package may include blocking the installation of the third-party application package on the platform-as-a-service platform. Additionally or alternatively, applying the compliance policy may include submitting a request to a workflow approval system for the installation of the third-party application package on the platform-as-a-service platform. In some examples, applying the compliance policy may be further based on an identifier of a user attempting to install the third-party application package on the platform-as-a-service platform.

In one embodiment, a system for implementing the above-described method may include 1) an identification module programmed to identify a platform-as-a-service platform that is configured to allow installations of third-party application packages, 2) an interception module programmed to intercept a third-party application package in transit to the platform-as-a-service platform for installation, 3) an extraction module programmed to extract metadata from the third-party application package, and 4) an application module programmed to apply a compliance policy to the third-party application package to determine whether to allow an installation of the third-party application package on the platform-as-a-service platform based on the metadata. The system may also include at least one processor configured to execute the identification module, the interception module, the extraction module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a platform-as-a-service platform that is configured to allow installations of third-party application packages, 2) intercept a third-party application package in transit to the platform-as-a-service platform for installation, 3) extract metadata from the third-party application package, and 4) apply a compliance policy to the third-party application package to determine whether to allow an installation of the third-party application package on the platform-as-a-service platform based on the metadata.

As will be explained in greater detail below, by intercepting attempts to install third-party application packages on platform-as-a-service platforms and applying compliance policies to the third-party application packages based on metadata within the third-party application packages to determine whether to allow the attempts to install the third-party application packages to proceed, the systems and methods described herein may facilitate the application of compliance policies to application package installations and/or configurations on platform-as-a-service platforms even where the platform-as-a-service platforms do not support the application of the compliance policies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
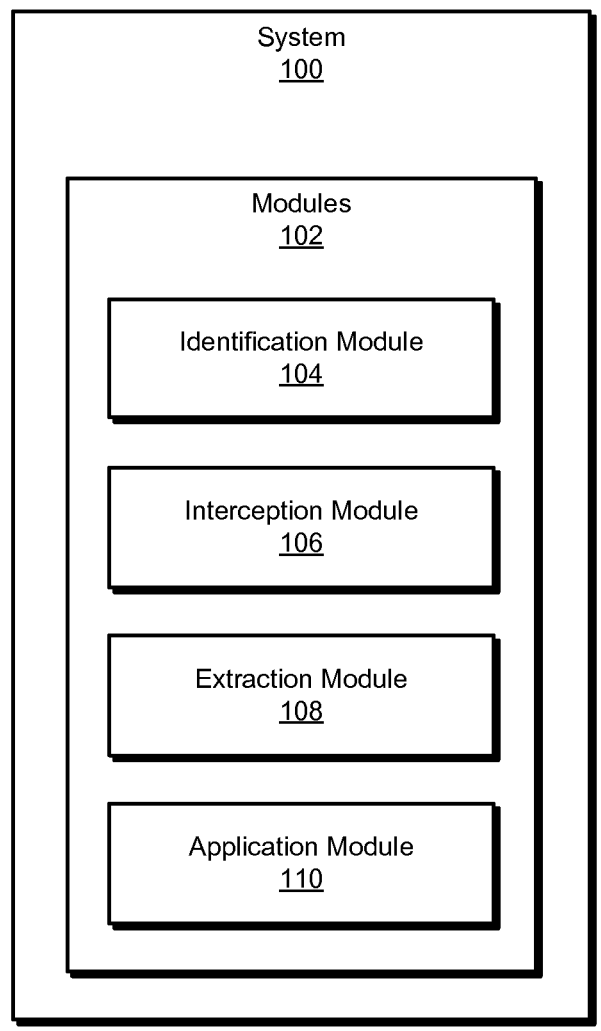
FIG. 1 is a block diagram of an exemplary system for protecting platform-as-a-service platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
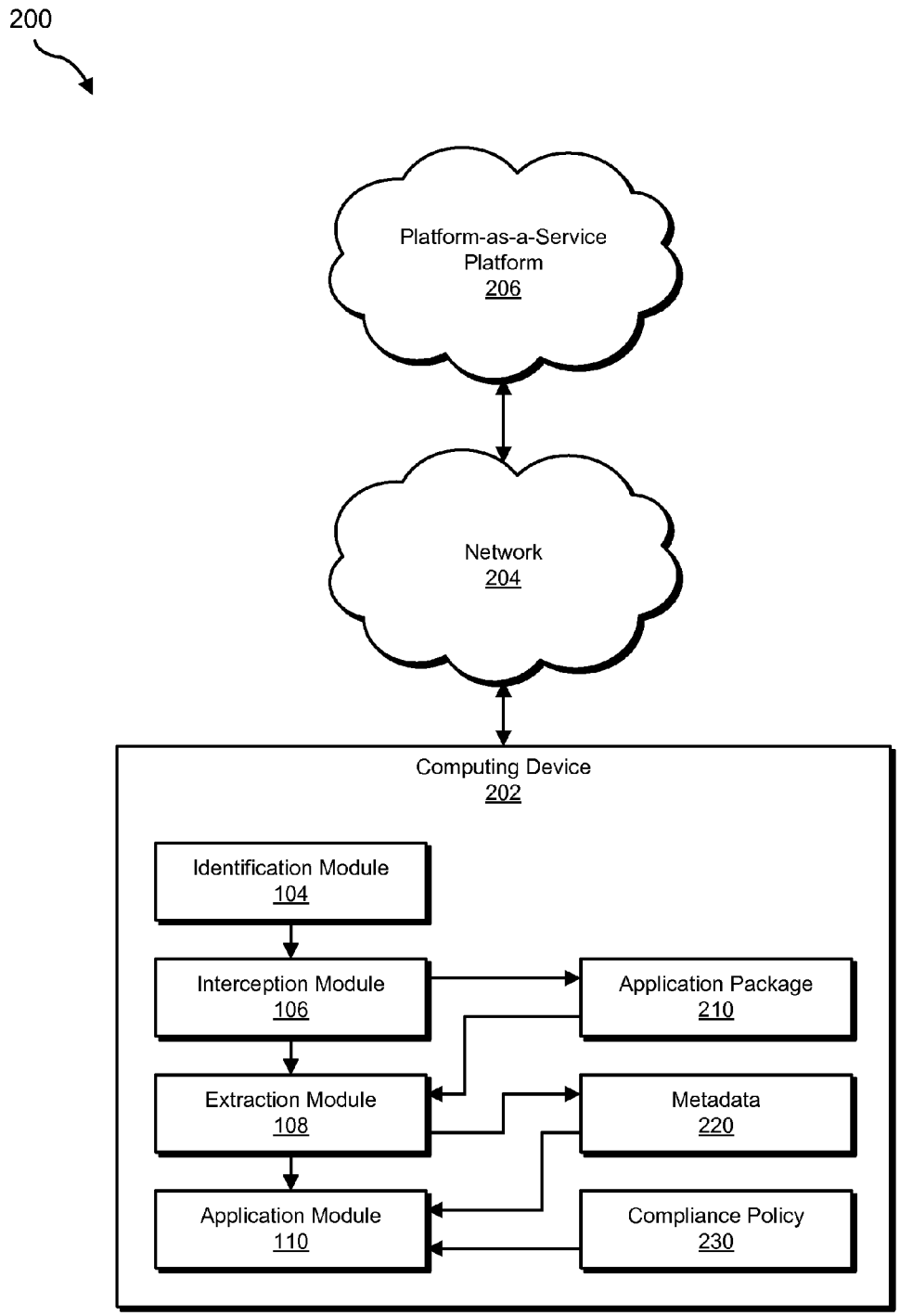
FIG. 2 is a block diagram of an exemplary system for protecting platform-as-a-service platforms.
Figure 3:
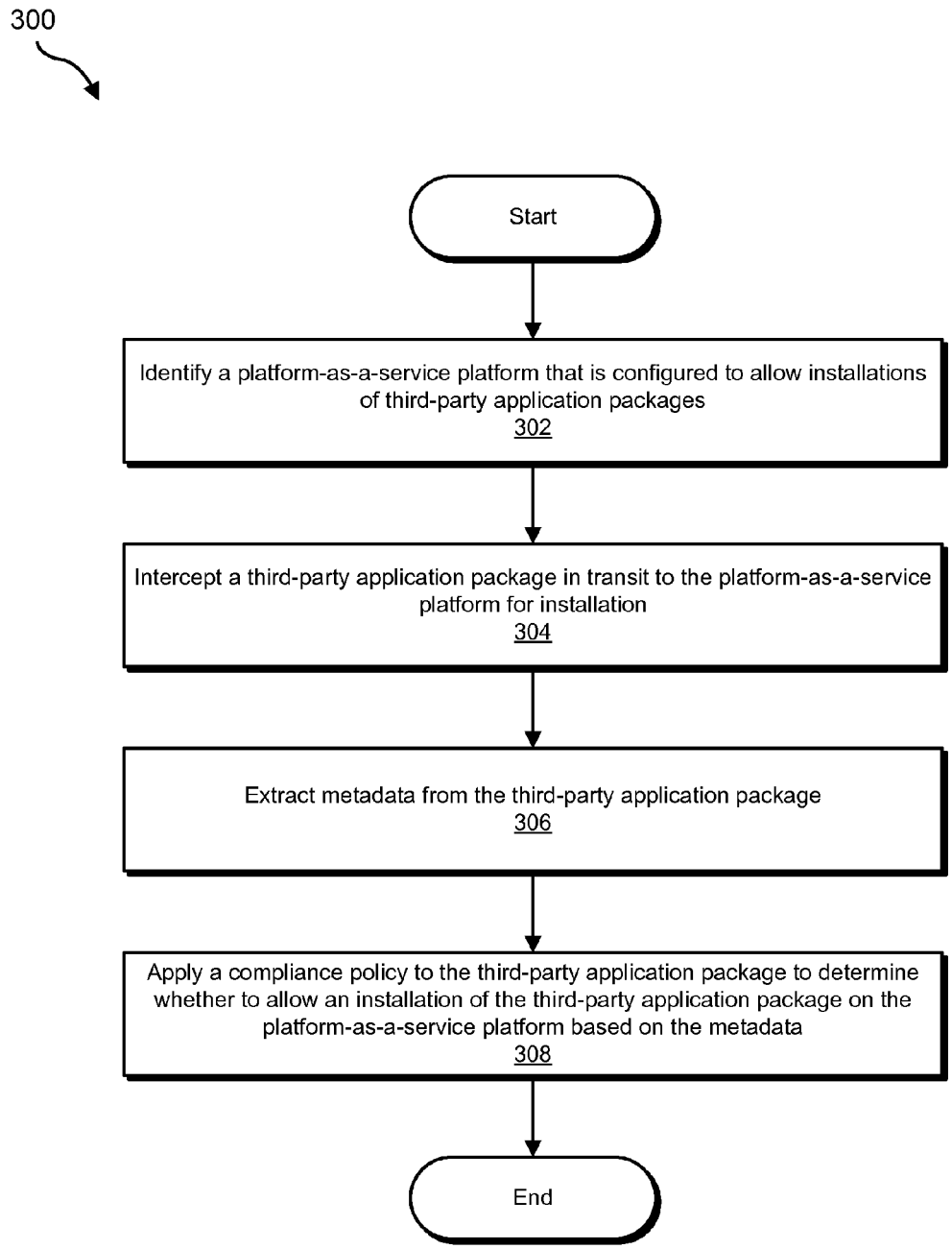
FIG. 3 is a flow diagram of an exemplary method for protecting platform-as-a-service platforms.
Figure 4:
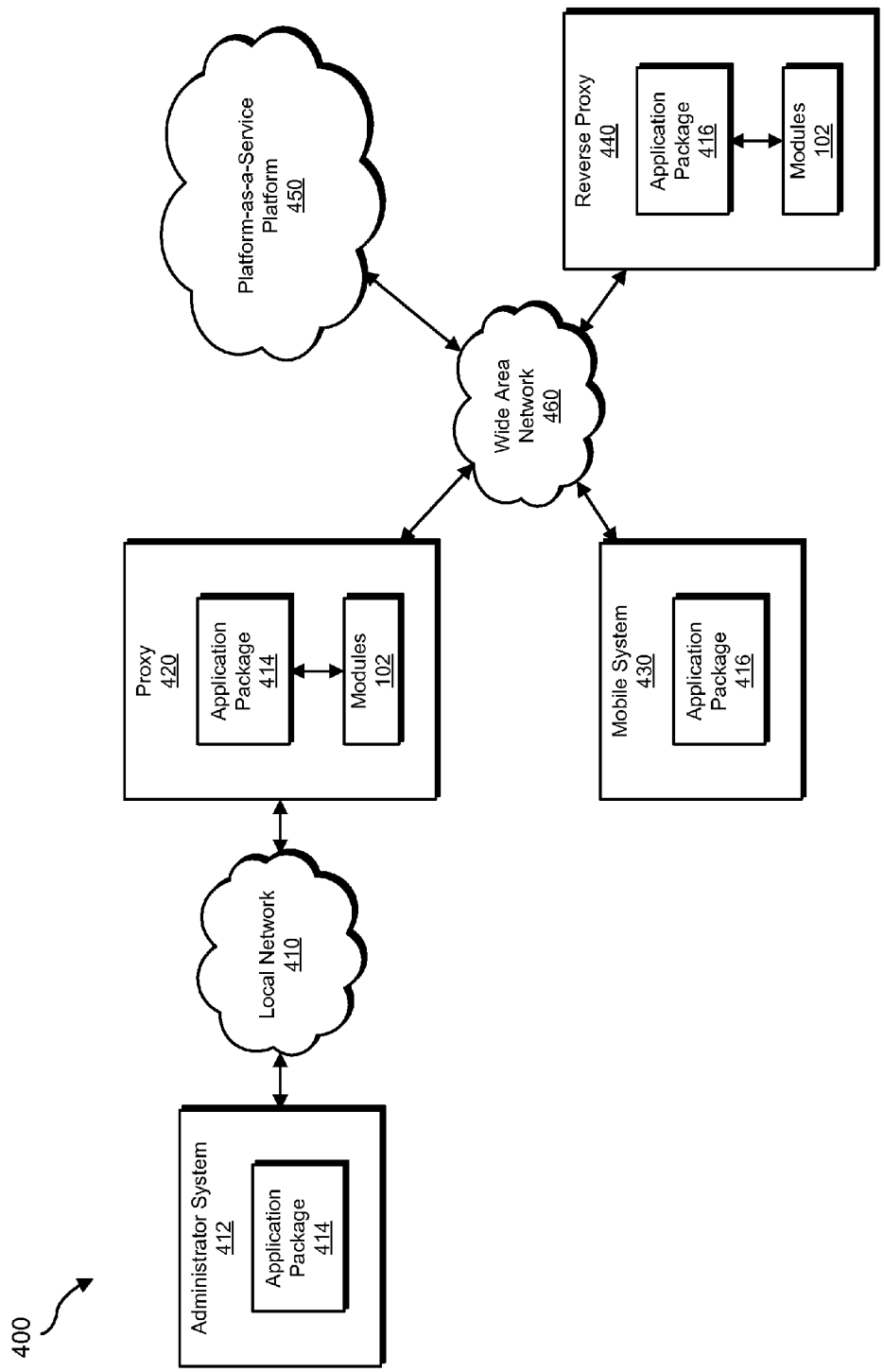
FIG. 4 is a block diagram of an exemplary system for protecting platform-as-a-service platforms.

The following will provide, with reference to FIGS. 1, 2, and 4, detailed descriptions of exemplary systems for protecting platform-as-a-service platforms. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for protecting platform-as-a-service platforms. As illustrated in this figure, exemplary system 100 may include one or more modules 102 for performing one or more tasks. For example, and as will be explained in greater detail below, exemplary system 100 may include an identification module 104 programmed to identify a platform-as-a-service platform that is configured to allow installations of third-party application packages. Exemplary system 100 may also include an interception module 106 programmed to intercept a third-party application package in transit to the platform-as-a-service platform for installation.

In addition, and as will be described in greater detail below, exemplary system 100 may include an extraction module 108 programmed to extract metadata from the third-party application package. Exemplary system 100 may also include an application module 110 programmed to apply a compliance policy to the third-party application package to determine whether to allow an installation of the third-party application package on the platform-as-a-service platform based on the metadata. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or platform-as-a-service platform 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a platform-as-a-service platform 206 via a network 204 (e.g., to attempt an installation of an application package 210 on platform-as-a-service platform 206).

In one embodiment, one or more of modules 102 from FIG. 1 may, when executed by at least one processor of computing device 202, facilitate computing device 202 in protecting platform-as-a-service platforms. For example, and as will be described in greater detail below, identification module 104, interception module 106, extraction module 108, and/or application module 110 may cause computing device 202 to 1) identify a platform-as-a-service platform 206 that is configured to allow installations of third-party application packages, 2) intercept third-party application package 210 in transit to platform-as-a-service platform 206 for installation, 3) extract metadata 220 from application package 210, and 4) apply a compliance policy 230 to application package 210 to determine whether to allow an installation of application package 210 on platform-as-a-service platform 206 based on metadata 220.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Platform-as-a-service platform 206 generally represents any type or form of computing device and/or collection of computing devices capable of reading computer-executable instructions. Examples of platform-as-a-service platform 206 include, without limitation, application servers and database servers configured to provide various database services and/or run certain software applications. Platform-as-a-service platform 206 may represent portions of a single computing device or a plurality of computing devices. For example, platform-as-a-service platform 206 may represent a portion of computing system 510 in FIG. 5 and/or portions of exemplary network architecture 600 in FIG. 6. Additionally or alternatively, platform-as-a-service platform 206 may represent one or more physically separate devices capable of being accessed by a computing device, such as computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for protecting platform-as-a-service platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a platform-as-a-service platform that is configured to allow installations of third-party application packages. For example, at step 302 identification module 104 may, as part of computing device 202 in FIG. 2, identify platform-as-a-service platform 206 that is configured to allow installations of third-party application packages.

As used herein, the phrase "platform-as-a-service" may refer to any computing model allowing access to a computing environment on-demand, via the Internet, and/or through a service provider. The computing environment of a platform-as-a-service platform may include hardware (e.g., a computing cluster) and a solution stack (e.g., including an operating system, an Internet server, a database system, etc.). In some examples, a platform-as-a-service solution may allow for scalability in resource usage. Additionally or alternatively, a platform-as-a-service solution may provide access to a platform to a subscriber without the subscriber building, managing, and/or maintaining the platform. For example, the service provider of a platform-as-a-service solution may provide maintenance and/or security of a computing platform made available to the subscriber. Consequently, the subscriber may lack complete access to the platform-as-a-service platform. In one example, the platform-as-a-service platform may include a single computing device and solution stack. Additionally or alternatively, the platform-as-a-service platform may include a cluster of computing devices and/or a virtualized computing platform running across a plurality of computing devices. In some examples, the platform-as-a-service may include a cloud platform and/or a virtual data center. In one example, the platform-as-a-service platform may include a FORCE.COM platform.

As used herein, the phrase "application package" may refer to any file, package, archive, and/or installation object for installing an application. In some examples, the application package may include one or more components. For example, the application package may include one or more computer-executable modules, scripts, workflows, data models, and/or Internet documents (e.g., web pages). In some examples, the application package may be configured for installing an application within a platform-as-a-service environment. For example, the application package may include one or more data items for configuring the application within a particular platform-as-a-service model. In some examples, the application to be installed by the application package may be configured to access existing data within the platform-as-a-service computing environment and/or external web services. Accordingly, as will be described in greater detail below, the application package may specify and/or include information identifying data to be used and/or accessed by the application once installed.

As used herein, the phrase "third-party application package" may refer to an application package created by and/or submitted to a platform-as-a-service provider for installation by a party other than the platform-as-a-service provider.

Identification module 104 may identify the platform-as-a-service platform in any suitable manner. For example, identification module 104 may identify the platform-as-a-service platform by identifying a network address of a platform-as-a-service provider. Additionally or alternatively, identification module 104 may identify the platform-as-a-service provider by executing on a proxy configured to intercept traffic destined for the platform-as-a-service provider. In some examples, identification module 104 may identify the platform-as-a-service platform by identifying an application package configured for installing an application on the platform-as-a-service platform.

FIG. 4 illustrates an exemplary system 400 for protecting platform-as-a-service platforms. As shown in FIG. 4, exemplary system 400 may include an administrator system 412 on a local network 410 with a proxy 420 intercepting traffic to a wide area network 460 that connects local network 410 to a platform-as-a-service platform 450. Exemplary system 400 may also include a mobile system 430 connected to a reverse proxy 440 via wide area network 460. Using FIG. 4 as an example, at step 304 identification module 104 may, as a part of modules 102 on proxy 420, identify platform-as-a-service platform 450. As another example, at step 304 identification module 104 may, as a part of modules 102 on reverse proxy 440, identify platform-as-a-service platform 450.

Returning to FIG. 3, at step 304 one or more of the systems described herein may intercept a third-party application package in transit to the platform-as-a-service platform for installation. For example, at step 304 interception module 106 may, as part of computing device 202 in FIG. 2, intercept third-party application package 210 in transit to platform-as-a-service platform 206 for installation.

Interception module 106 may intercept the third-party application package in any of a variety of contexts. For example, interception module 106 may intercept the third-party application package on a proxy system configured to intercept network traffic leaving a computing environment that includes an administration system for the platform-as-a-service platform. The administration system may include any system for submitting third-party application packages to and/or remotely initiating the installation of third-party application packages on the platform-as-a-service platform. The computing environment may include any of a variety of computing configurations. For example, the computing environment may include a local network (e.g., connected to a wide area network by a router and/or gateway, the wide area network connecting the local network to the platform-as-a-service platform). Additionally or alternatively, the computing device may include one or more computing devices under the control of a subscriber to the platform-as-a-service platform.

In another example, interception module 106 may intercept the third-party application package on a reverse proxy system. As used herein, the phrase "reverse proxy" may refer to any proxy configured to receive network traffic on behalf of a target computing system (and, e.g., relay approved network traffic to the target computing system). For example, interception module 106 may intercept the third-party application package from a mobile computing device configured to use the reverse proxy system to access the platform-as-a-service platform. In this example, the mobile computing device may be configured to use the reverse proxy system in any of a variety of ways. For example, the mobile computing device may include one or more links for the platform-as-a-service platform that specify the reverse proxy system. Additionally or alternatively the mobile computing device may include an administration application for the platform-as-a-service platform that directs network traffic to the reverse proxy system. In some examples, the mobile computing device may use a single sign-on system for providing access to the platform-as-a-service platform via the reverse proxy.

Interception module 106 may intercept the third-party application package in any of a variety of ways. For example, interception module 106 may identify the third-party application package and not forward the third-party application package to the platform-as-a-service platform. Additionally or alternatively, interception module 106 may intercept a request and/or command to install the third-party application package.

Using FIG. 4 as an example, at step 304 interception module 106 may, as a part of modules 102 on proxy 420, intercept an application package 414 from administrator system 412 targeted to platform-as-a-service platform 450. In another example, mobile system 430 may be configured to access platform-as-a-service platform 450 via reverse proxy 440. In this example, at step 304 interception module 106 may, as a part of modules 102 on reverse proxy 440, intercept an application package 416 from mobile system 430.

Returning to FIG. 3, at step 306 one or more of the systems described herein may extract metadata from the third-party application package. For example, at step 306 extraction module 108 may, as part of computing device 202 in FIG. 2, extract metadata 220 from application package 210.

As used herein, the term "metadata" as applied to an application package may refer to any data specifying characteristics of the application package that may be relevant to one or more compliance policies. In some examples, the metadata may include metadata used by the platform-as-a-service platform for installing the application package and/or establishing connections between an application of the application package and other applications, data structures, and/or resources within an internal framework of the platform-as-a-service platform.

The metadata may include any of a variety of data. For example, the metadata may include 1) information identifying a component of the third-party application package, 2) information identifying a data structure to create within the platform-as-a-service platform by the component, 3) information identifying a resource of an existing application within the platform-as-a-service platform subject to use by an application to be installed from the third-party application package, 4) information identifying an external service to be accessed by the application from the platform-as-a-service platform, and/or 5) information identifying additional configuration parameters for the application. For example, the metadata may specify that an application installed from the third-party application package has access to sensitive customer data. Additionally or alternatively, the metadata may specify that the application installed from the third-party application package accesses unsecure web services.

Extraction module 108 may extract the metadata in any suitable manner. For example, extraction module 108 may extract a manifest file from the application package and parse the manifest file for the metadata. Additionally or alternatively, extraction module 108 may identify and/or analyze one or more application components within the application package to identify the metadata.

Using FIG. 4 as an example, at step 306 extraction module 108 may, as a part of modules 102 on proxy 420, extract metadata from application package 414. As another example, at step 306 extraction module 108 may, as a part of modules 102 on reverse proxy 440, extract metadata from application package 416.

Returning to FIG. 3, at step 308 one or more of the systems described herein may apply a compliance policy to the third-party application package to determine whether to allow an installation of the third-party application package on the platform-as-a-service platform based on the metadata. For example, at step 308 application module 110 may, as part of computing device 202 in FIG. 2, apply compliance policy 230 to application package 210 to determine whether to allow an installation of application package 210 on platform-as-a-service platform 206 based on metadata 220.

As used herein, the phrase "compliance policy" may refer to any policy, rule, rule set, filter, algorithm, and/or heuristic for determining a disposition of a data object and/or an attempted computing action.

The compliance policy may specify and/or result in any of a variety of dispositions. For example, application module 110 may block the installation and/or configuration of the third-party application package on the platform-as-a-service platform based on the metadata (e.g., by determining that the third-party application package is configured to install an application that accesses sensitive data, unsecure web services, etc.). In another example, application module 110 may submit a request to a workflow approval system for the installation of the third-party application package on the platform-as-a-service platform. For example, application module 110 may determine, based on the metadata, that the third-party application package is configured to install an application that accesses and/or potentially accesses sensitive data and/or unsecure web services, and that the installation is therefore subject to approval. For example, application module 110 may send a request for approval to an administration system configured to allow one or more authorized administrators to approve or block the attempt to install the application package. Additionally or alternatively, application module 110 may simply notify one or more administrators of the attempt to install the application package (e.g., by email).

In some examples, application module 110 may apply the compliance policy further based on an identifier of a user attempting to install the third-party application package on the platform-as-a-service platform. For example, application module 110 may identify a username of the user, a user group of the user, a permission of the user, and/or a system of the user to determine whether the user is authorized to install the application package in light of the metadata. For example, the compliance policy may specify that only administrators on a whitelist are authorized to install an application package of an application that accesses specified sensitive data.

Using FIG. 4 as an example, at step 308 application module 110 may, as a part of modules 102 on proxy 420, block application package 414 from platform-as-a-service platform 450 based on a compliance policy applied to the metadata of application package 414. As another example, at step 308 application module 110 may, as a part of modules 102 on reverse proxy 440, block application package 416 from platform-as-a-service platform 450 based on a compliance policy applied to the metadata of application package 416.

As explained above, by intercepting attempts to install third-party application packages on platform-as-a-service platforms and applying compliance policies to the third-party application packages based on metadata within the third-party application packages to determine whether to allow the attempts to install the third-party application packages to proceed, the systems and methods described herein may facilitate the application of compliance policies to application package installations on platform-as-a-service platforms even where the platform-as-a-service platforms do not support the application of the compliance policies.

Figure 5:
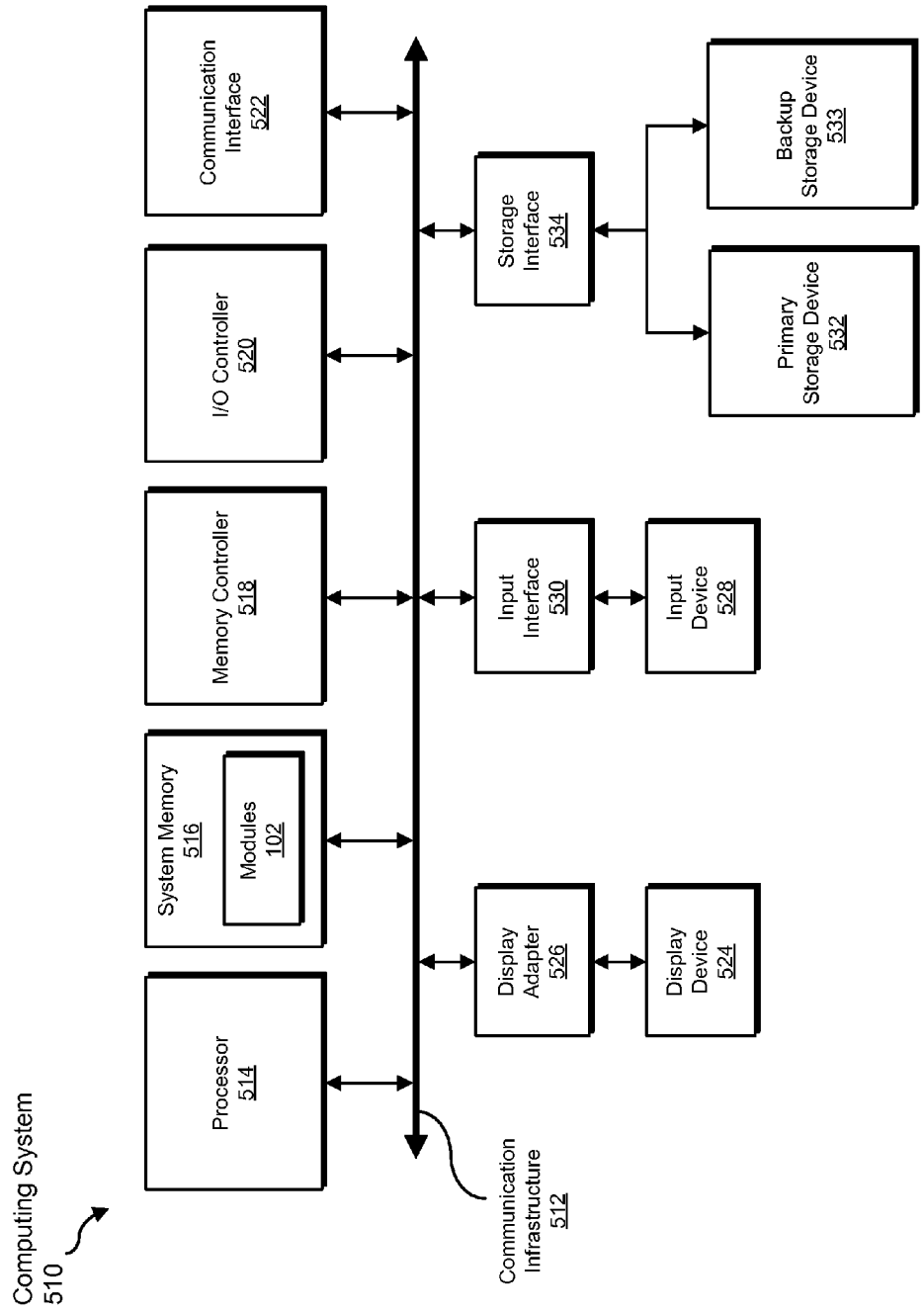
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, intercepting, extracting, applying, determining, blocking, and submitting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
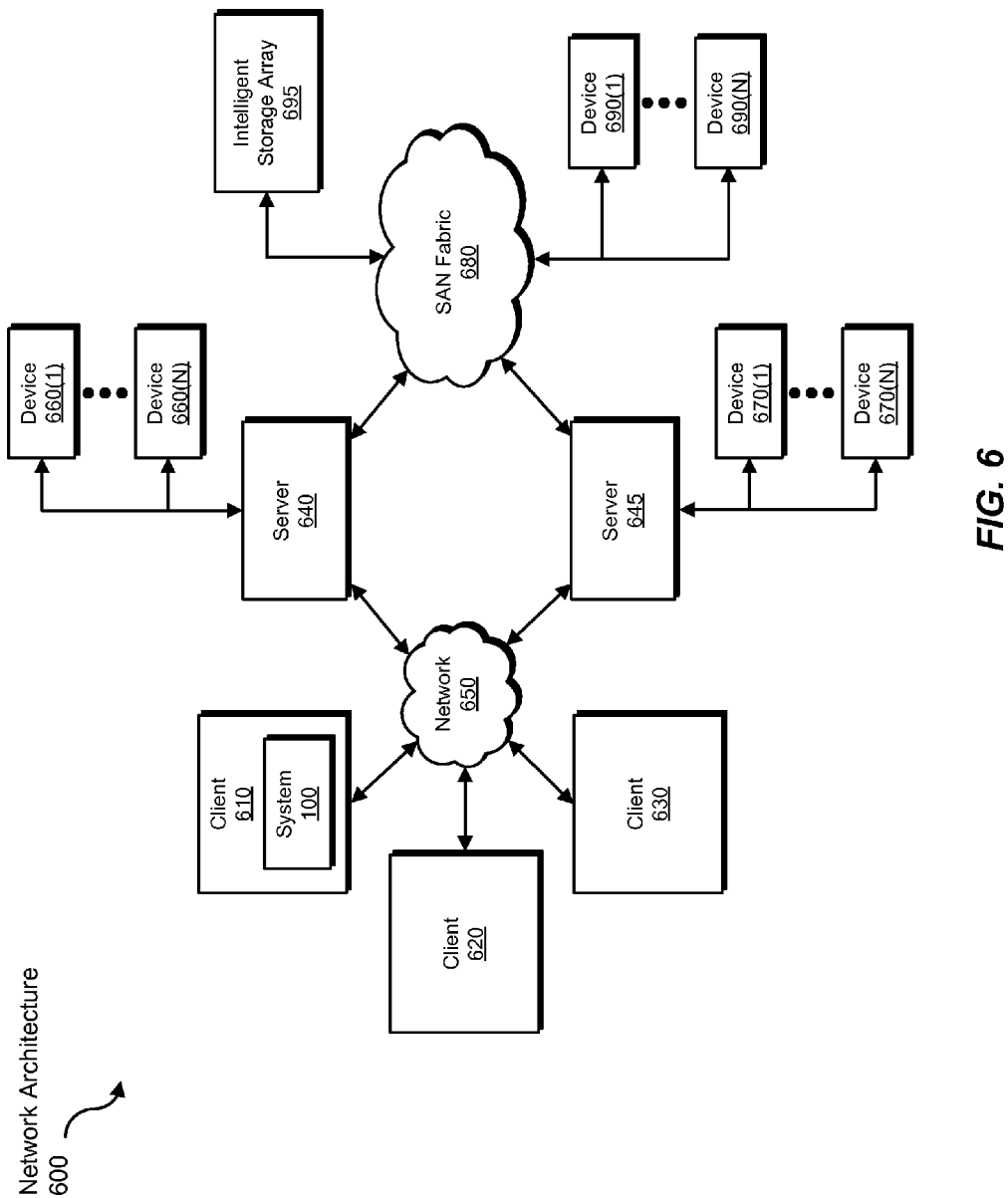
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, intercepting, extracting, applying, determining, blocking, and submitting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for protecting platform-as-a-service platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for blocking the installation of application packages to platform-as-a-service devices based on compliance policies.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting platform-as-a-service platforms, at least a portion of the method being performed by a computing device comprising at least one processor, the method comprising:
    identifying a platform-as-a-service platform that enables on-demand access to a computing environment via the Internet and/or a service provider, the platform-as-a-service platform being configured to allow installations of third-party application packages;
    intercepting, at a reverse proxy system that is configured to receive network traffic on behalf of the platform-as-a-service platform and to relay approved network traffic to the platform-as-a-service platform, a third-party application package in transit to the platform-as-a-service platform for installation;
    extracting a manifest file from the third-party application package;
    parsing the manifest file to obtain metadata that specifies characteristics of the third-party application package, wherein the metadata comprises information identifying a resource of an existing application within the platform-as-a-service platform subject to use by an application to be installed from the third-party application package;
    applying a compliance policy to the third-party application package to determine whether to allow an installation of the third-party application package on the platform-as-a-service platform based on the metadata.

2. The computer-implemented method of claim 1, wherein the third-party application package comprises an application package created by a provider other than a provider of the platform-as-a-service platform.

3. The computer-implemented method of claim 1, wherein applying the compliance policy to the third-party application package based on the metadata comprises submitting a request to a workflow approval system for the installation of the third-party application package on the platform-as-a-service platform.

4. The computer-implemented method of claim 1, wherein:
    intercepting the third-party application package comprises intercepting the third-party application package on a proxy system configured to intercept network traffic leaving the computing environment, the computing environment comprising an administration system for the platform-as-a-service platform;
    the administration system is configured to submit third-party application packages to the platform-as-a-service platform.

5. The computer-implemented method of claim 1, wherein intercepting the third-party application package comprises intercepting the third-party application package from a mobile computing device configured to use the reverse proxy system to access the platform-as-a-service platform.

6. The computer-implemented method of claim 1, wherein the platform-as-a-service platform does not support the application of compliance policies.

7. A system for protecting platform-as-a-service platforms, the system comprising:
- an identification module programmed to identify a platform-as-a-service platform that enables on-demand access to a computing environment via the Internet and/or a service provider, the platform-as-a-service platform being configured to allow installations of third-party application packages;
- an interception module programmed to intercept, at a reverse proxy system that is configured to receive network traffic on behalf of the platform-as-a-service platform and to relay approved network traffic to the platform-as-a-service platform, a third-party application package in transit to the platform-as-a-service platform for installation;
- an extraction module programmed to extract a manifest file from the third-party application package and to parse the manifest file to obtain metadata that specifies characteristics of the third-party application package, wherein the metadata comprises information identifying a resource of an existing application within the platform-as-a-service platform subject to use by an application to be installed from the third-party application package;
- an application module programmed to apply a compliance policy to the third-party application package to determine whether to allow an installation of the third-party application package on the platform-as-a-service platform based on the metadata;
- at least one processor configured to execute the identification module, the interception module, the extraction module, and the application module.

8. The system of claim 7, wherein the application module is programmed to apply the compliance policy to the third-party application package based on the metadata by blocking the installation of the third-party application package on the platform-as-a-service platform.

9. The system of claim 7, wherein the application module is programmed to apply the compliance policy to the third-party application package based on the metadata by submitting a request to a workflow approval system for the installation of the third-party application package on the platform-as-a-service platform.

10. The system of claim 7, wherein:
- the interception module is programmed to intercept the third-party application package by intercepting the third-party application package on a proxy system configured to intercept network traffic leaving the computing environment, the computing environment comprising an administration system for the platform-as-a-service platform;
- the administration system is configured to submit third-party application packages to the platform-as-a-service platform.

11. The system of claim 7, wherein the interception module is programmed to intercept the third-party application package by intercepting the third-party application package from a mobile computing device configured to use the reverse proxy system to access the platform-as-a-service platform.

12. The system of claim 7, wherein the metadata specifies that an application installed from the third-party application package accesses unsecure web services.

13. The system of claim 7, wherein the application module is programmed to apply the compliance policy based on an identifier of a user attempting to install the third-party application package on the platform-as-a-service platform.

14. A non-transitory computer-readable-storage medium comprising one or more computer-executable instructions that, when executed by at least one processor of a computing device, cause the computing device to:
- identify a platform-as-a-service platform that enables on-demand access to a computing environment via the Internet and/or a service provider, the platform-as-a-service platform being configured to allow installations of third-party application packages;
- intercept, at a reverse proxy system that is configured to receive network traffic on behalf of the platform-as-a-service platform and to relay approved network traffic to the platform-as-a-service platform, a third-party application package in transit to the platform-as-a-service platform for installation;
- extract a manifest file from the third-party application package;
- parse the manifest file to obtain metadata that specifies characteristics of the third-party application package, wherein the metadata comprises information identifying a resource of an existing application within the platform-as-a-service platform subject to use by an application to be installed from the third-party application package;
- apply a compliance policy to the third-party application package to determine whether to allow an installation of the third-party application package on the platform-as-a-service platform based on the metadata.

15. The non-transitory computer-readable-storage medium of claim 14, wherein the one or more computer-executable instructions cause the computing device to apply the compliance policy to the third-party application package based on the metadata by causing the computing device to block the installation of the third-party application package on the platform-as-a-service platform.

16. The non-transitory computer-readable-storage medium of claim 14, wherein the one or more computer-executable instructions cause the computing device to apply the compliance policy to the third-party application package based on the metadata by causing the computing device to submit a request to a workflow approval system for the installation of the third-party application package on the platform-as-a-service platform.

17. The non-transitory computer-readable-storage medium of claim 14, wherein:
- the one or more computer-executable instructions cause the computing device to intercept the third-party application package by causing the computing device to intercept the third-party application package on a proxy system configured to intercept network traffic leaving the computing environment, the computing environment comprising an administration system for the platform-as-a-service platform;
- the administration system is configured to submit third-party application packages to the platform-as-a-service platform.

18. The non-transitory computer-readable-storage medium of claim 14, wherein the one or more computer-executable instructions cause the computing device to intercept the third-party application package by causing the computing device to intercept the third-party application package from a mobile computing device configured to use the reverse proxy system to access the platform-as-a-service platform.

19. The non-transitory computer-readable-storage medium of claim 14, wherein the platform-as-a-service platform does not support the application of compliance policies.

* * * * *